Figure 1:
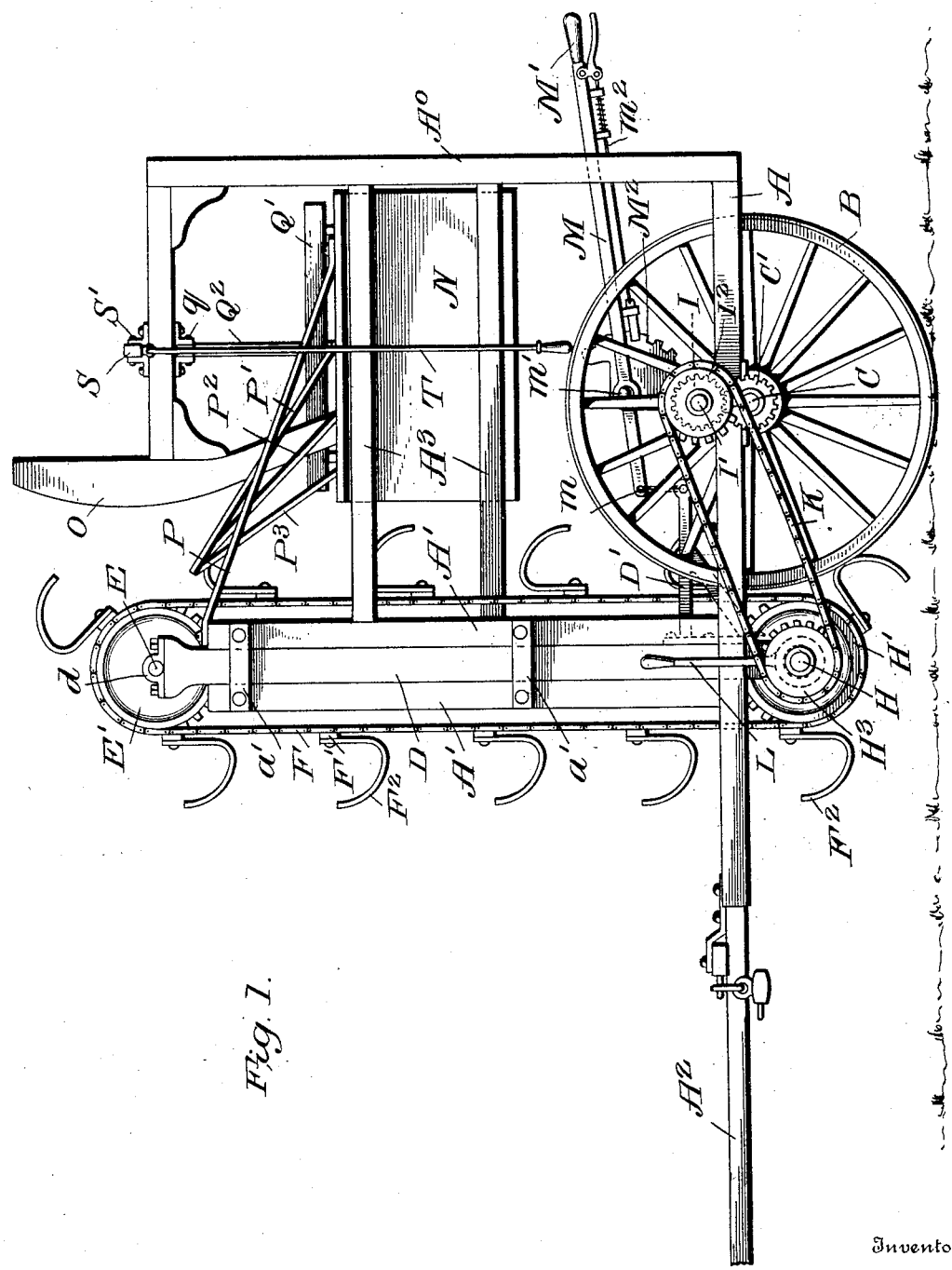

No. 745,911. PATENTED DEC. 1, 1903.
A. J. SAVOIE.
CANE LOADER.
APPLICATION FILED JULY 6, 1903.
NO MODEL. 4 SHEETS—SHEET 1.

Witnesses
Geo. A. Byrne
Fred W. Englert

Inventor
A. J. Savoie,
By Wilkinson & Fisher,
Attorneys

No. 745,911. PATENTED DEC. 1, 1903.
A. J. SAVOIE.
CANE LOADER.
APPLICATION FILED JULY 6, 1903.
NO MODEL. 4 SHEETS—SHEET 2.
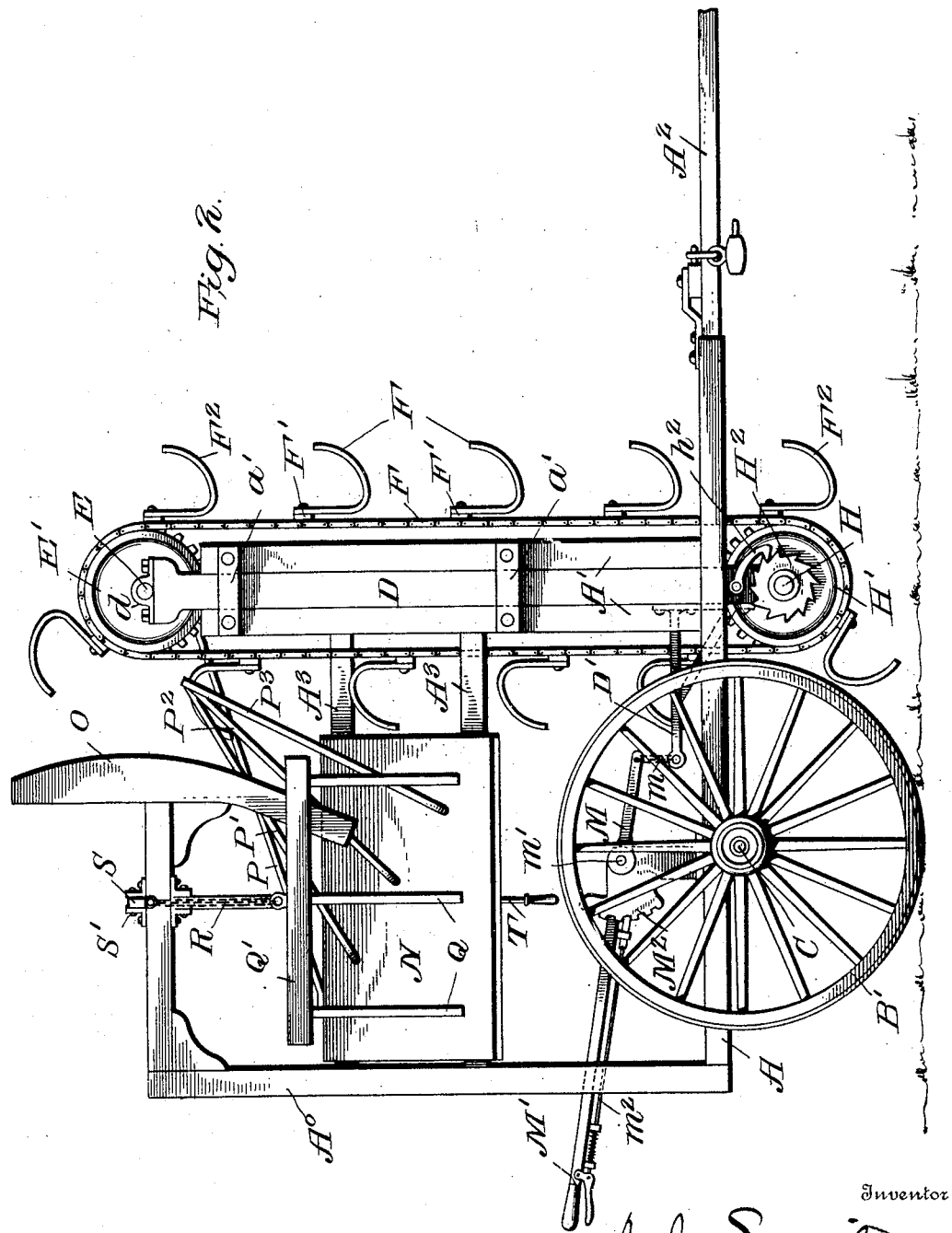

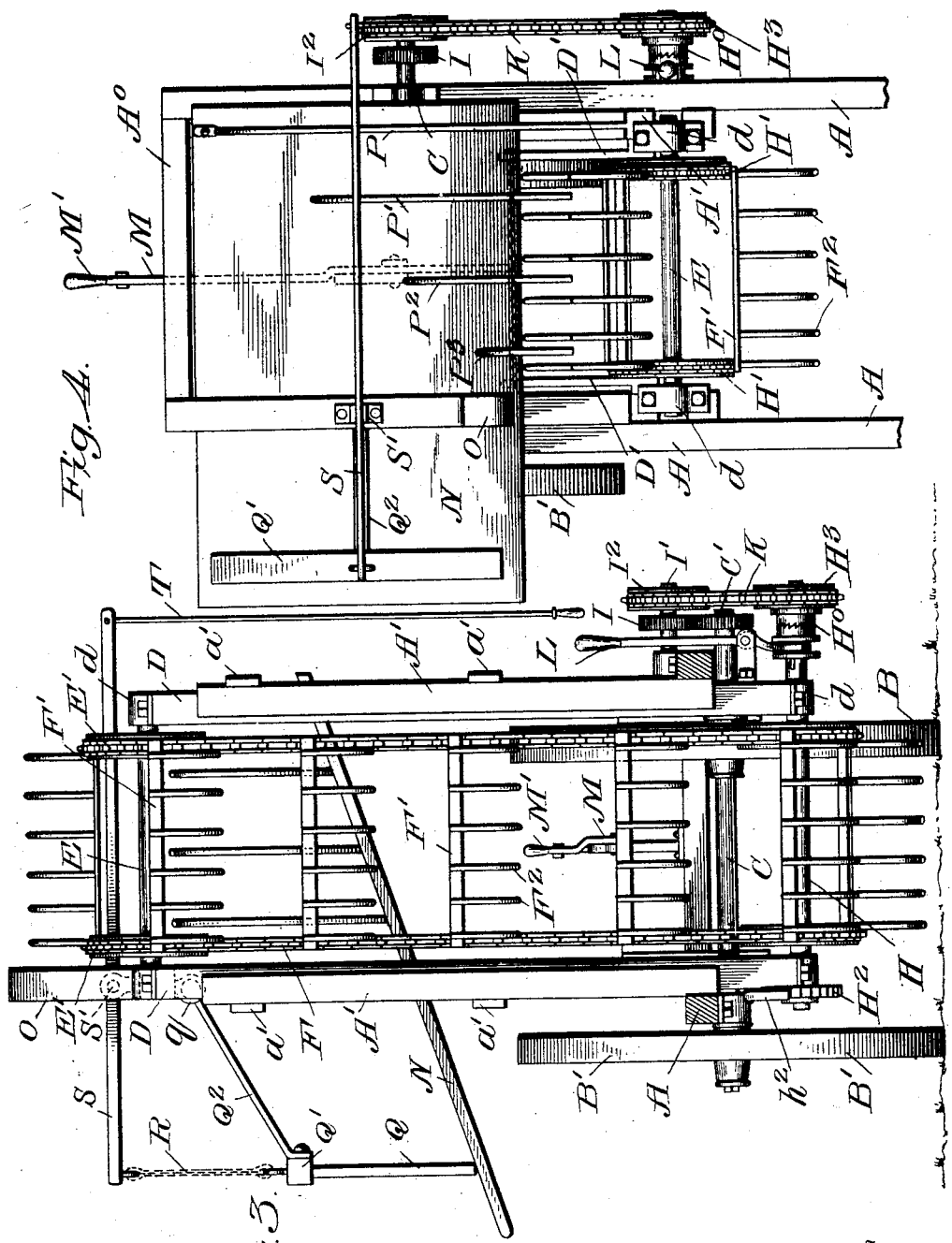

No. 745,911. PATENTED DEC. 1, 1903.
A. J. SAVOIE.
CANE LOADER.
APPLICATION FILED JULY 6, 1903.
NO MODEL. 4 SHEETS—SHEET 4.
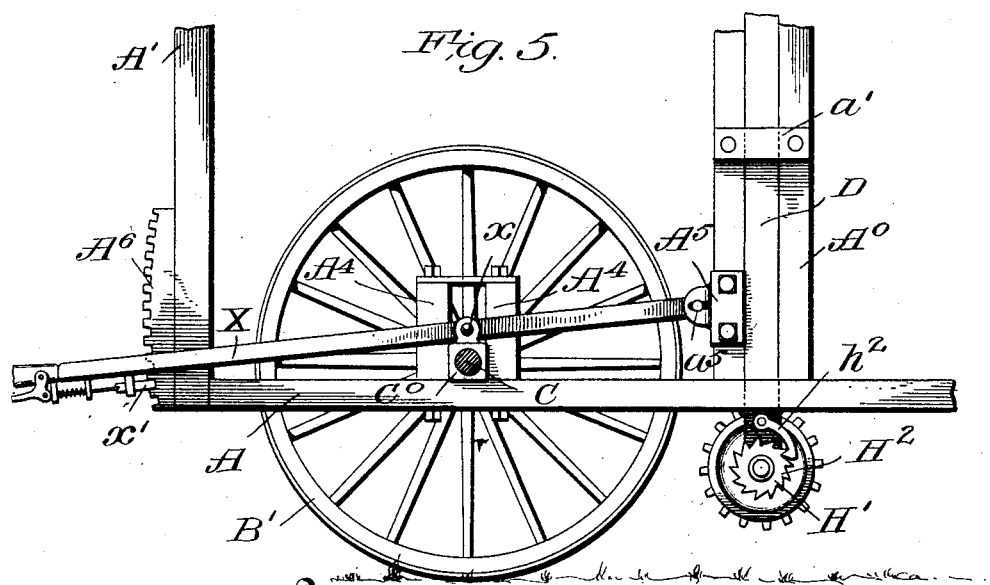
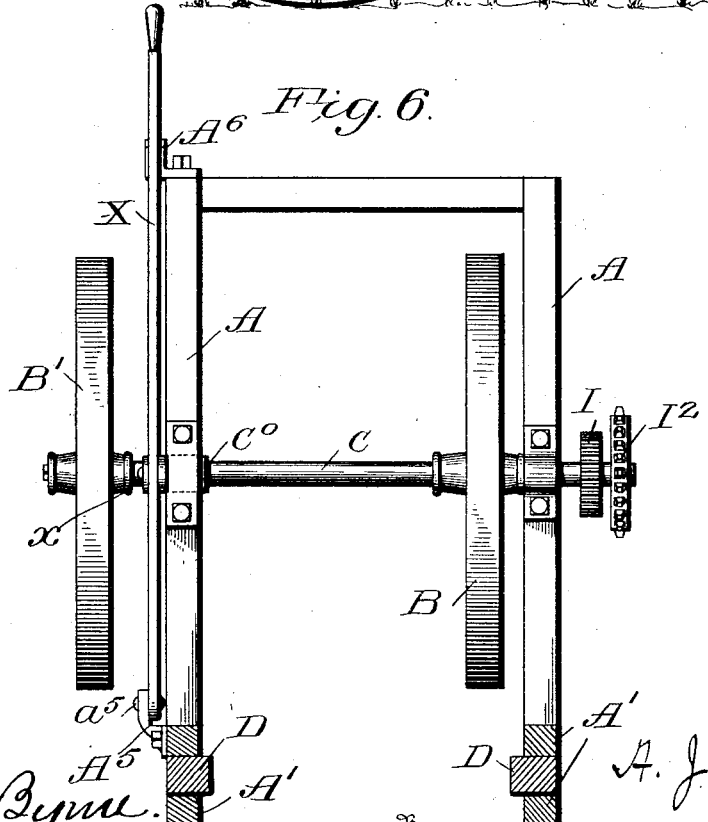
Witnesses
Inventor
A. J. Savoie,
By
Wilkinson & Fisher,
Attorneys No. 745,911.

Patented December 1, 1903.

UNITED STATES PATENT OFFICE.

ANATOLE J. SAVOIE, OF CRAWFORD, LOUISIANA.

CANE-LOADER.

SPECIFICATION forming part of Letters Patent No. 745,911, dated December 1, 1903.

Application filed July 6, 1903. Serial No. 164,475. (No model.)

*To all whom it may concern:*

Be it known that I, ANATOLE J. SAVOIE, a citizen of the United States, residing at Crawford, in the parish of St. Mary and State of Louisiana, have invented certain new and useful Improvements in Cane-Loaders; and I do hereby declare the following to be a full, clear, and exact description of the invention, such as will enable others skilled in the art to which it appertains to make and use the same.

My invention relates to apparatus for loading sugar-cane or cornstalks from the field onto carts, wagons, or cars, and it is especially intended for the loading of sugar-cane.

In ordinary practice in the United States sugar-cane is grown in rows bedded up, and in time of harvest the stalks have the dead leaves or trash stripped by hand with caneknives. The tops of the stalks are then cut off, with the green leaves, and the stalk is cut near the surface of the ground and is thrown by the cane-cutter across the hollow or trough which exists between two adjacent rows. The length of the stalk is generally approximately the distance between the tops of the adjacent beds, so that there is apt to be an air-space between the bottom of the lowest stalks on the pile and the bottom of the hollow. In practice the stalks from three or more rows are all thrown across the hollow between one pair of rows, so that vehicles may drive between beds of cut cane without their wheels crushing any of the cane after it has been cut.

My invention consists in an improved apparatus by means of which a vehicle is drawn by horse or mule power or is propelled by steam, gasolene, or other equivalent power along the row in which the cut cane is bedded, from which it is picked up by the loader and is delivered into a cart, wagon, or car which travels alongside of the loader, with its wheels spanning one of the rows from which the cane has been removed.

My invention will be understood by reference to the accompanying drawings, in which the same parts are indicated by the same letters throughout the several views.

Figure 1 represents a side elevation of the improved cane-loader. Fig. 2 shows a side elevation as seen from the opposite side. Fig. 3 is a front view. Fig. 4 is a plan view. Fig. 5 shows a modification, and Fig. 6 is a plan view of the device shown in Fig. 5.

A represents the frame or body of the wagon, on which are provided the uprights A', the rear frame $A^0$, and the cross-pieces $A^3$.

$A^2$ shows shafts for hitching horses or mules to.

The frame is carried on the wheels B and B', mounted on the axle C. Where horsepower is used, a single pair of wheels may be sufficient; but where motive engines are used it will be necessary to provide steadyingwheels. (Not shown.) These, however, are a well-known expedient and will not be further described. One of the wheels, B', is loosely journaled on the axle C, and the other, B, is secured fast to that axle and serves as a drive-wheel for the mechanism that will be hereinafter described. It will be obvious, however, that both wheels may be made fast to the axle, if preferred.

Mounted between the uprights A' and the cross-pieces $a'$ are the sliding pieces D, which carry journal-bearings $d$ at each end thereof, in which bearings are mounted the shafts E and H, respectively. The shaft E carries the two sprocket-wheels E'. The shaft H carries the two sprocket-wheels H', over which wheels travel the side sprocket-chains F of the endless conveyer, which picks up the cane from the ground. These sprocket-chains are spanned by cross-pieces F', to which the hooks $F^2$ are connected, which hooks pass under and lift up the cane. The shaft H is provided with a clutch $H^0$, which is thrown in and out of action by means of the clutch-lever L and when in action engages another clutch member rigidly attached to the sprocket-wheel $H^3$, over which sprocket-wheel passes a sprocket-chain K, which also passes over the sprocket-wheel $I^2$ on the shaft I'. This shaft is driven by means of the gears C' and I, the former being fast on the axle C and turned by means of the drive-wheel B as the loader travels along the ground. Thus it will be seen that the motion of the vehicle along the ground will cause the sprocket $H^3$ to rotate, and this motion may be transmitted to the conveyer by means of the clutch $H^0$, as before described.

To prevent the conveyer from turning backward when the clutch is uncoupled, I provide a ratchet-and-pawl arrangement, as shown at H² and h² in Fig. 2.

In order to lift the conveyer from obstructions—such as stumps, inequalities in the hollow between the rows, or the like—I provide any suitable hoisting apparatus, one form of which is indicated in Figs. 1 and 2, where D' represents a bracket fast to the sliding piece D, one on each side, which bracket is connected, by means of the chain m, to the lever M, which is pivoted at m' to a suitable rack M², in which rack the pawl m² engages. This pawl may be operated by an attendant at the handle M'. The two brackets D' are both connected to a single handle, as indicated in Fig. 3, and by means of this handle the side pieces D, with the endless conveyer carried thereby, may be raised or lowered and held in the desired position at the will of the operator.

After the cane reaches the top of the conveyer it falls from the hooks F² onto the inclined bars P, P', P², and P³, which are mounted above the chute N.

O represents a curved deflector against which one end of the stalks strikes, which, combined with the action of the inclined bars P to P³, causes the stalks to slue around through an angle of approximately ninety degrees, causing them to pile up on the chute N parallel to the longitudinal axis of the vehicle. A suitable removable device should be provided to prevent the stalks from falling off of this chute except when the cart, wagon, or car to be loaded is alongside, or, in other words, to prevent the cane from falling off of the chute except when desired. I have provided a device for this purpose somewhat similar in shape to a rake, having teeth Q, a cross-piece Q', and an arm Q², pivoted, as at q, to the frame of the machine. This rake is suspended, by means of the chain R, from the lever S, which is pivoted to the frame of the machine, as at S'. At the other end of the lever is connected the rod T, terminating in a suitable handle. By pulling up on this handle the rake is lifted and the cane is allowed to fall from the chute. When the handle is released, the weight of the rake will cause it to fall down and obstruct the passage of the cane from the chute. Any suitable device for accomplishing the same purpose will be adopted, if desired.

In order to allow one of the wheels to travel on the top of the bed or hill and the other in the hollow and yet have the frame of the vehicle in the substantially level position, I may use the device shown in Figs. 5 and 6, in which device the construction of the rest of the apparatus would be substantially the same as shown in the previous figures, but in which the journal-box C⁰ of the axle C travels between vertical guides A⁴, fast to the frame A, and is adjusted at the desired position by means of the lever X, pivoted to the bracket A⁵, slotted, as at a⁵, and fast to the frame of the machine. The position of this lever is adjusted by means of the pawl x' engaging in the rack A⁶, fast to the frame of the machine. Thus it will be seen that the axle C may be tilted, while at the same time the frame A remains substantially horizontal.

It will be obvious that various modifications might be made in the herein-described apparatus which could be used without departing from the spirit of my invention.

Having thus described my invention, what I claim, and desire to secure by Letters Patent of the United States, is—

1. In a cane-loader, the combination with a frame and wheels and an axle supporting the same, of an endless conveyer carried by said frame, means for moving said conveyer vertically in said frame, mechanism operated from said axle for driving said conveyer, means for swinging the cane-stalks through a right angle after being dumped from said conveyer, a chute, and means for releasing the cane from said chute when desired, substantially as described.

2. In a cane-loader, the combination with a frame and wheels and an axle supporting the same, of an endless conveyer carried by said frame, means for moving said conveyer vertically in said frame, mechanism operated from said axle for driving said conveyer, means for swinging the cane-stalks through a right angle after being dumped from said conveyer, a chute, a gate, and a lever pivoted to said gate for lifting same and thus releasing the cane from said chute, substantially as described.

3. In a cane-loader, the combination with a frame and wheels and an axle supporting the same, of an endless conveyer carried by said frame, and provided with a series of hooks for picking up and carrying the cane, means for moving said conveyer vertically in said frame, mechanism operated from said axle for driving said conveyer, means for swinging the cane-stalks through a right angle after being dumped from said conveyer, a chute, and means for releasing the cane from said chute when desired, substantially as described.

4. In a cane-loader, the combination with a frame and wheels and an axle supporting the same, of an endless conveyer carried by said frame, and provided with a series of hooks for picking up and carrying the cane, means for moving said conveyer vertically in said frame, mechanism operated from said axle for driving said conveyer, means for swinging the cane-stalks through a right angle after being dumped from said conveyer, a chute, a gate, and a lever pivoted to said gate for lifting same and thus releasing the cane from said chute, substantially as described.

5. In a cane-loader, the combination with a frame and wheels and an axle supporting the same, of an endless conveyer carried by said frame, means for moving said conveyer vertically in said frame, mechanism operated from said axle for driving said conveyer, clutch mechanism for throwing said conveyer into and out of operation when desired, means for swinging the cane-stalks through a right angle after being dumped from said conveyer, a chute, and means for releasing the cane from said chute when desired, substantially as described.

6. In a cane-loader, the combination with a frame and wheels and an axle supporting the same, of an endless conveyer carried by said frame, means for moving said conveyer vertically in said frame, mechanism for driving said conveyer, means for swinging the cane-stalks through a right angle after being dumped from said conveyer, a chute, and means for releasing the cane from said chute when desired, substantially as described.

7. In a cane-loader, the combination with a frame and wheels and an axle supporting the same, of an endless conveyer carried by said frame, mechanism for driving said conveyer, means for swinging the cane-stalks through a right angle after being dumped from said conveyer, a chute, and means for releasing the cane from said chute when desired, substantially as described.

8. In a cane-loader, the combination with a frame and wheels and an axle supporting the same, of an endless conveyer carried by said frame, mechanism operated from said axle for driving said conveyer, a curved deflector and inclined bars for swinging the cane-stalks through a right angle after being dumped from said conveyer, a chute, and means for releasing the cane from said chute when desired, substantially as described.

9. In a cane-loader, the combination with a frame and wheels and an axle supporting the same, of an endless conveyer carried by said frame, means for moving said conveyer vertically in said frame, mechanism operated from said axle for driving said conveyer, a curved deflector and inclined bars for swinging the cane-stalks through a right angle after being dumped from said conveyer, a chute, and means for releasing the cane from said chute when desired, substantially as described.

10. In a cane-loader, the combination with a frame and wheels and an axle supporting the same, of an endless conveyer carried by said frame, and provided with a series of hooks for lifting the cane, means for moving said conveyer vertically in said frame, mechanism for driving said conveyer, a curved deflector and inclined bars for swinging the cane-stalks through a right angle after being dumped from said conveyer, a chute, and means for releasing the cane from said chute when desired, substantially as described.

In testimony whereof I affix my signature in presence of two witnesses.

ANATOLE J. SAVOIE.

Witnesses:
 JEAN MARIE DUFOUR,
 E. D. BLANCHARD.